Oct. 24, 1967  M. ROSSNAN  3,348,807

APPARATUS FOR JACKING MOTOR VEHICLES

Filed May 6, 1966  2 Sheets-Sheet 1

Michael Rossnan
INVENTOR

Oct. 24, 1967  M. ROSSNAN  3,348,807
APPARATUS FOR JACKING MOTOR VEHICLES
Filed May 6, 1966  2 Sheets-Sheet 2

Michael Rossnan
INVENTOR

United States Patent Office 3,348,807
Patented Oct. 24, 1967

3,348,807
APPARATUS FOR JACKING MOTOR VEHICLES
Michael Rossnan, 11724 Lovejoy St.,
Silver Spring, Md. 20902
Filed May 6, 1966, Ser. No. 622,374
9 Claims. (Cl. 254—94)

ABSTRACT OF THE DISCLOSURE

A jacking device for motor vehicles consisting of a circular ground-engaging member associated with a vehicle attached fixture adjacent the wheel and having adjustable means for varying the eccentricity of the disk and thus permit the jack's use on motor vehicle wheels of different diameters.

---

The present invention relates to improvements in apparatus for jacking motor vehicle wheels.

One object of the invention is the provision of a detachable motor vehicle activated device which, when the motor vehicle is moved by motor power or pushed a short distance, in either direction the corner of the vehicle by which the wheel is to be raised or jacked, lifts such part so that the wheel, whether for blow-out or changing, is raised from contact with the supporting surface to permit access to a free rotating wheel.

In order that the invention may be fully understood, and its various advantages appreciated, attention is invited to the accompanying drawings, in which.

Figure 1:
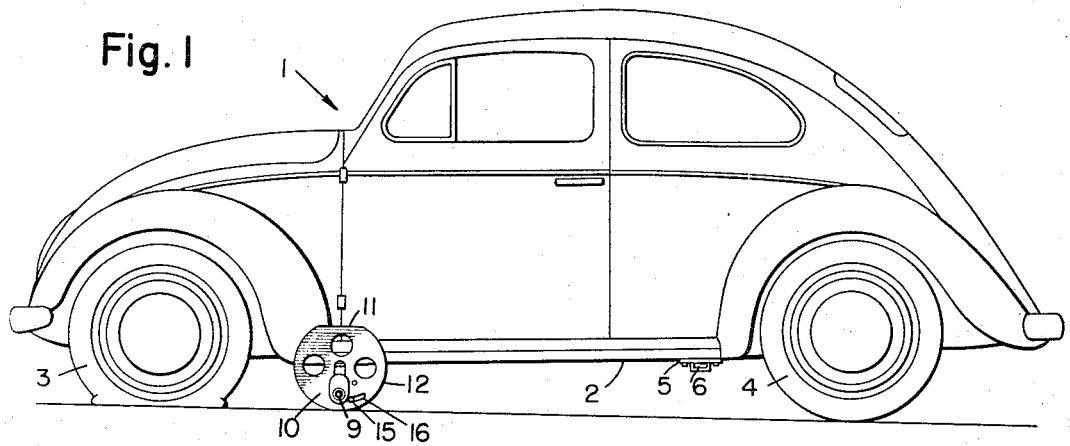
FIGURE 1 is a side view of a motor vehicle with the device in place at the first step.

Referring to the drawings, the numeral 1 designates a motor vehicle having a chassis 2, and, in this instance, the front wheel 3 and rear wheel 4.

Attached to the chassis at four places thereon, and here shown at two places, is a metal bracket 5, carrying the rectangular socket 6 to slidingly receive the male rectangular metal member 7, which has an inclined relatively short elbow 8, which in turn carries a stub axle or shaft 9, either fixedly or adjustably mounted in the circular jacking disk 10 at a point eccentrically so that the flat portion 11 of the disk member is farthest from the center of the axle.

Figure 2:
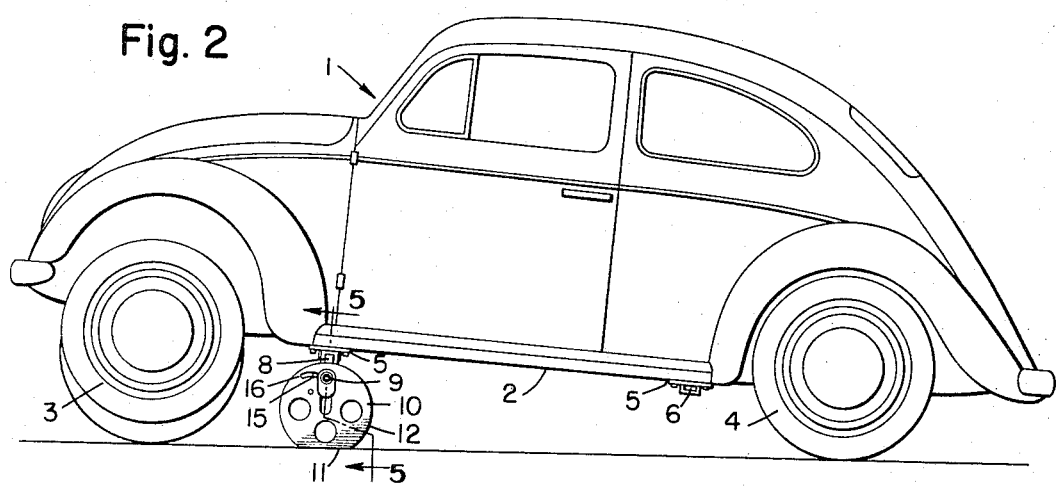
FIGURE 2 is a similar view showing the device in its jacking position with the wheel elevated and out of contact with the supporting surface.
Figure 3:
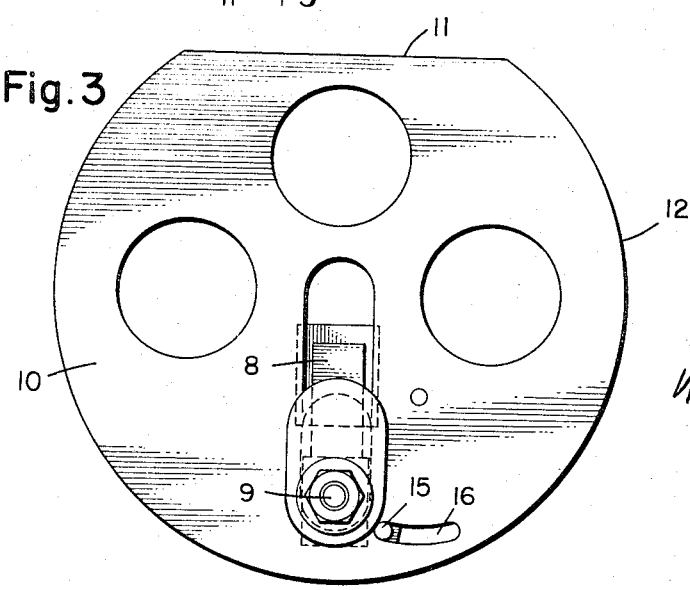
FIGURE 3 is a front view of the device per se.
Figure 4:
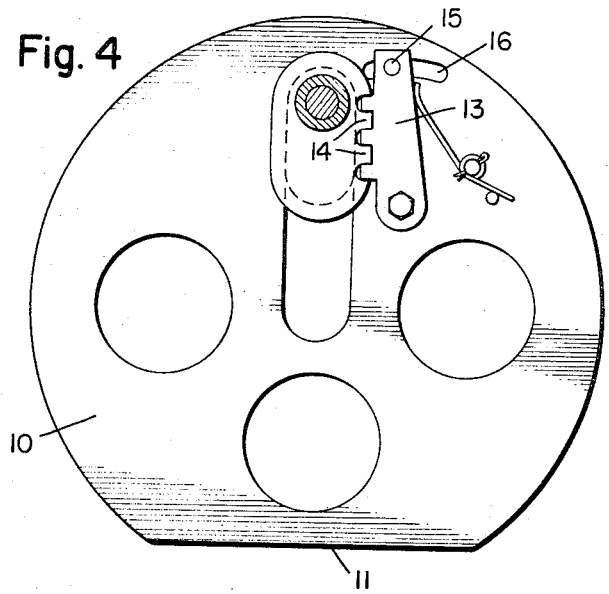
FIGURE 4 is a rear view thereof.
Figure 5:
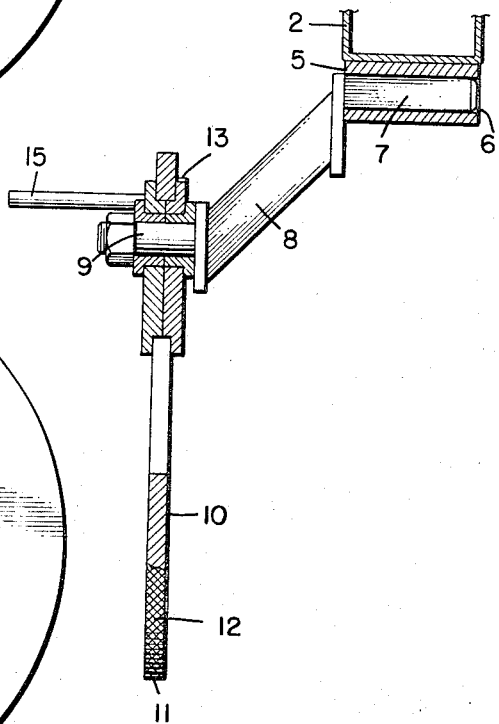
FIGURE 5 is a section on line 5—5 of FIGURE 2.
Figure 7:
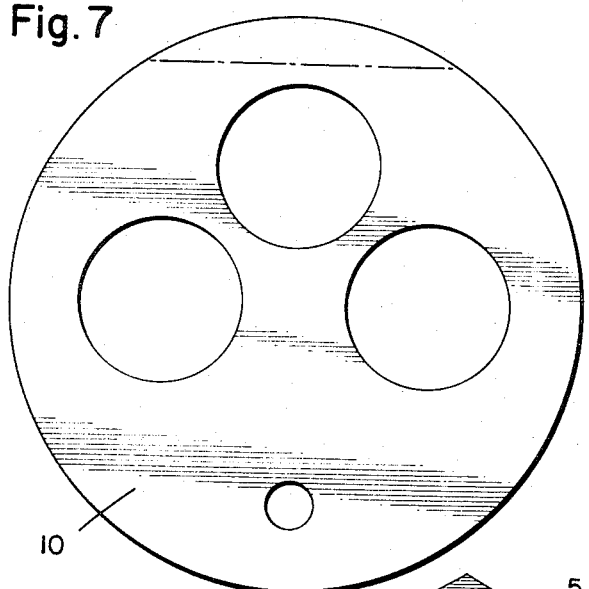
FIGURE 7 is a front view of the modified construction of the circular disk jack.
Figure 6:
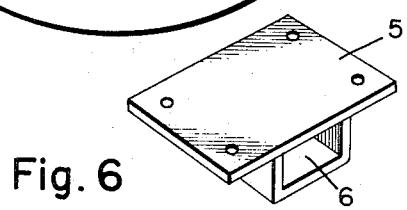
FIGURE 6 is a perspective view of the chassis-carried socket member.

When it is desired to jack up the rear wheel, as shown in FIGS. 1 and 2, the jacking member, whose periphery is provided with transverse milled portions 12, the part of the periphery nearest to the stub axle is contacting the carrying surface, such as a road or garage floor. Thus when the car is moved forwardly or backwardly on its own power or by pushing only a short distance so as to cause the jacking disk to rotate until the flat edge thereof is in contact with the supporting surface, the wheel, as shown in FIG. 2, will be lifted so that the wheel at that point, rear or front, is elevated out of contact with the supporting surface and free to be operated upon or removed, and another wheel substituted. When the work on the wheel is completed, the spring-held dog or detent 13 is moved out of contact with its toothed rack 14 by means of the straight handle 15, which moves through its slot 16, as shown, and the jacking disk can then be removed from its chassis carried supporting member after the wheel is permitted to contact the supporting surface.

From the foregoing description taken in connection with the drawings, it will be seen and understood that there is provided a simple and readily installable and removable jacking device, and which when not in use can be readily stored in a car trunk, and one that is easily and with dispatch attached at any one of the four places that contains the female fixed support, and by movement forward or rearward of the motor vehicle under its own power or by pushing it a very short distance, it will be jacked up at that selected part so that the wheel can be operated upon or changed.

What is claimed as new is:

1. A jacking device for motor vehicles including in combination a hardware member for attachment to the chassis of such vehicle and having a non-circular opened socket, a stub axle having an end for slideable reception in said socket, a disk-like member provided with means to radially and slideably, adjustably receive the other end of said axle, and means adjacent said first mentioned means for releasably adjustably positioning said other end in said first mentioned means.

2. A jacking device for motor vehicles as claimed in claim 1, wherein the hardware is a metal rectangular socketed member with means to attach same to the vehicle.

3. A jacking device for motor vehicles as claimed in claim 1, wherein the disk is a circular one.

4. A jacking device for motor vehicles as claimed in claim 1, wherein the disk is a circular one and has one portion of its periphery flattened.

5. A jacking device for vehicles as claimed in claim 1, wherein the adjusting means comprises a toothed rack carried by the stub axle and a spring-held detent carried by the disk member for engaging selected teeth of the rack to regulate the position of the stub axle to the disk-like member.

6. A jacking device for motor vehicles as claimed in claim 1, wherein the disk member is circular and provided with an elongated opening, and selective adjustable means for varying the height of the stub axle relatively to the disk mounted slideably in said opening and carried by the disk adjacent said opening.

7. A jacking device for motor vehicles as claimed in claim 1, wherein the disk member is circular with a portion of its periphery flattened and with an elongated opening angled to the flattened portion of the periphery of the disk but beyond the axis and adjacent the opposite side of the periphery of the disk, and cooperative selective means carried respectively by the end of the stub axle within the opening of the disk and by the disk adjacent the opening whereby the position of the stub axle is adjusted relative to the periphery of the disk.

8. A jacking device for motor vehicles as claimed in claim 1, wherein the disk member is circular and provided with a rectangular opening radially of the disk, and cooperative selective adjusting means carried respectively by the stub axle and the disk so that the stub axle may be adjusted relatively to the axis of the disk.

9. A jacking device for motor vehicles as claimed in claim 1, wherein the disk member is circular and provided with a rectangular opening radially of the disk, and means for adjusting the stub axle relative to the disk consisting of a toothed member carried by the stub axle and movable in the rectangular opening, and a spring detent carried by the disk adjacent the opening for engaging the toothed member to hold the stub axle in adjusted and selected positions.

References Cited

UNITED STATES PATENTS

| 634,100 | 10/1899 | Wise | 254—94 |
| 900,720 | 10/1908 | Gilman | 254—94 |
| 1,634,391 | 7/1927 | Amiss | 254—94 |
| 1,805,508 | 5/1931 | Angelillo | 254—94 |

FOREIGN PATENTS

| 403,953 | 12/1933 | Great Britain. |

OTHELL M. SIMPSON, *Primary Examiner.*